UNITED STATES PATENT OFFICE.

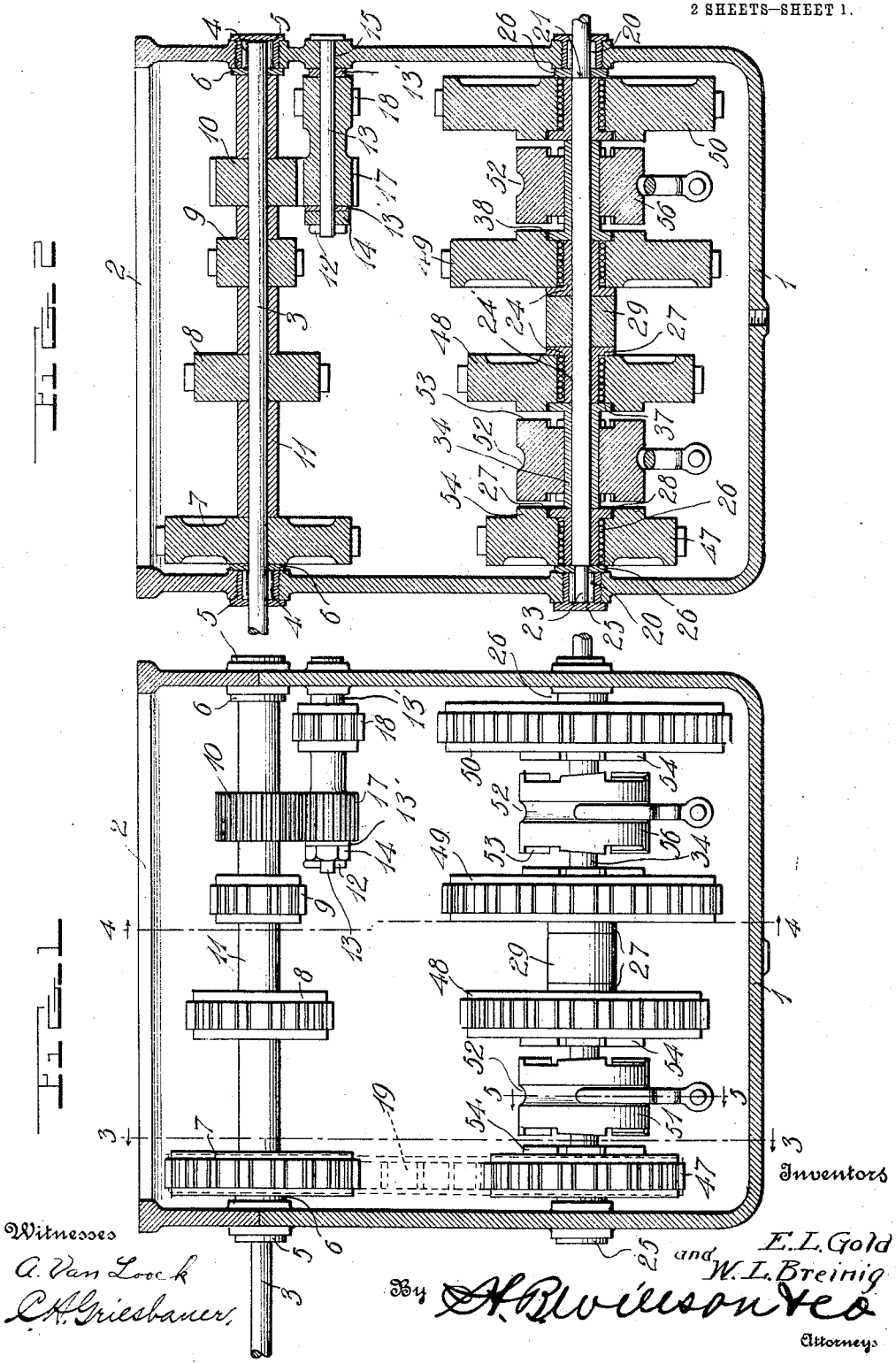

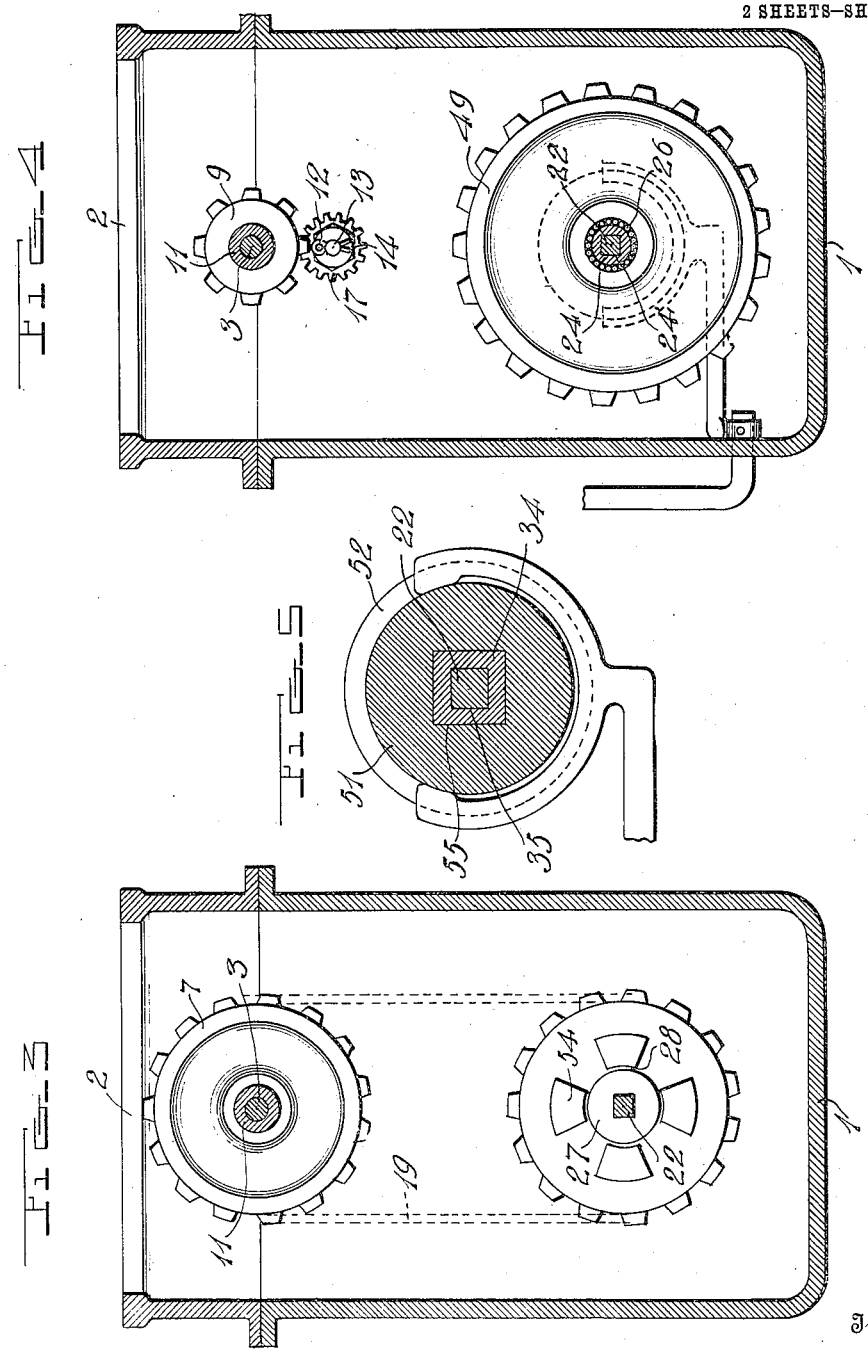

EDGAR L. GOLD AND WARREN L. BREINIG, OF NAZARETH, PENNSYLVANIA.

POSITIVE-CLUTCH TRANSMISSION MECHANISM.

1,058,231. Specification of Letters Patent. Patented Apr. 8, 1913.

Application filed October 7, 1912. Serial No. 724,474.

*To all whom it may concern:*

Be it known that we, EDGAR L. GOLD and WARREN L. BREINIG, citizens of the United States, residing at Nazareth, in the county of Northampton and State of Pennsylvania, have invented certain new and useful Improvements in Positive-Clutch Transmission Mechanism; and we do declare the following to be a full, clear, and exact description of the invention, such as will enable others skilled in the art to which it appertains to make and use the same.

This invention relates to machine elements, and more especially to sprocket gearing; and the object of the same is to produce a transmission mechanism for automobiles and the like wherein the drive shaft is connected with the driven shaft by a series of chains and sprocket wheels, and wherein the various parts are easily separated as for cleaning and repair. These objects are accomplished by constructing this improved positive clutch transmission mechanism in the manner hereinafter more fully described and claimed and as shown in the drawings wherein—

Figure 1 is a vertical sectional view through the gear casing showing the gears in elevation. Fig. 2 is a similar view showing the gears in section. Figs. 3, 4 and 5 are transverse sectional views on the lines 3—3, 4—4, and 5—5 of Fig. 1.

In the drawings the numeral 1 designates the cup-shaped lower portion of the casing, and the numeral 2 designates the upper portion thereof which is attached to but removable from the lower portion on a line through the drive shaft 3 which is connected with the motor in a manner not necessary to illustrate. By preference this shaft passes through roller bearings 4 and bushings 5 which come off with and may later be removed from the shaft as the latter is lifted off the lower portion of the casing—the upper portion having first been removed in a manner which will be clear, and within the casing next within the bushings 5 are case hardened washers 6 surrounding said shaft. Next adjacent the forward washer there is keyed on the shaft a large sprocket wheel 7 for producing high speed, and farther to the rear at proper intervals are keyed thereon successively smaller sprocket wheels 8 and 9 and a gear 10 for producing intermediate and low speed and for producing a reverse—these wheels being separated by collars 11 which fill out the spaces between them and between the rearmost wheel 10 and the rear washer 6. It will be obvious that when the drive shaft with its wheels and collars is removed from the casing and the bushings withdrawn from the shaft, or even the rearmost bushing and its roller bearing removed, all of the wheels and collars can be withdrawn longitudinally from the shaft if the keying is done in a proper manner.

Directly below the rearmost bearing of the driving shaft 3 a pin 13 projects through an eye 15 in the rear wall of the casing and forms a journal for an idler which is held in place between washers 13' thereon by means of a nut 14 at the inner end of the pin, and possibly a cotter pin 12 to hold the nut from unscrewing. This idler has gear teeth 17 at its front end engaging the gear wheel 10, and sprocket teeth 18 at its rear end as shown. From the several sprocket wheels 7, 8, 9 and 18, chains 19 lead downward to the driven sprocket wheels yet to be described, but for sake of clearness I have illustrated only one of these chains at 19 and shown it in dotted lines. Such chains, like the driving wheels and driven wheels, run in a bath of grease and are therefore thoroughly lubricated and entirely noiseless; and if a link in any chain belt should break, the only result would be that that belt would fall off the sprocket wheels which it engages and drop into the bottom of the casing and thereafter the vehicle could not be driven at that speed until the belt was replaced.

The driven shaft is shown as mounted within the casing so as to project from the rear end thereof or in an opposite direction to that in which the drive shaft 3 projects from the casing, and while this is the usual arrangement we do not wish to be limited thereto. Said shaft is round at its rear portion up to 21, squared or angular within the casing as shown at 22, and reduced and rounded at its front end as at 23; and the rounded portions are inclosed by bushings 25 and roller bearings 20, while case hardened washers 26 stand on these round portions next inside the front and rear walls of the casing 1, and between these bushings are disposed the several driven sprocket wheels and the clutch members yet to be described. In order to carry these wheels and members, we slip onto the square portions 22 of the driven shaft a series of short sleeves 24 and interposed longer sleeves 34; and in the arrangement shown there are two short sleeves and a longer sleeve between them at the rear side of the casing, a similar group at the front side of the casing, and a collar 29 at the mid-length of the squared portion 22 of the driven shaft between the groups of sleeves. Each sleeve 24 has a square bore 24' whereas its exterior is cylindrical so that a ball- or roller-bearing 26 may surround it within the hub of the driven sprocket gear 47, and the inner end of the sleeve carries an enlarged head 27 fitting into a recess 28 in this side of the sprocket gear. Each longer sleeve 34 has a bore 35 which is square, and the exterior of its body is also square so as to slidably engage the square bore 55 of a clutch element yet to be described; and the sleeve has a head 37 at its inner end fitting into a recess 38 in the next sprocket gear 48 as shown. In the group illustrated there is another similar short sleeve 24 mounted in bearings inside said sprocket wheel 48, with its head 27 standing in contact with the collar 29; and the arrangement of the three sleeves at the other side of said collar toward the rear of the casing is the same excepting that their heads are reversed and the sprocket gears 49 and 50 are larger. It will be understood, of course, that the larger sprocket gear 50 is connected by a chain belt with the sprocket teeth 18 on the idler so that this gear rotates in the opposite direction around its short sleeve 24 from the other gears 47, 48 and 49—the obvious purpose being to produce reverse drive as well understood. The length of each longer sleeve 34 is such that the clutch element which is slidably mounted upon it is free to move longitudinally between the contiguous gears, and these elements are moved to and fro or caused to stand at rest in a neutral position by mechanism not necessary to describe and illustrate as it forms no part of the present invention. Each element as best seen in Figs. 1 and 5 comprises a tubular body 51 surrounded by a groove 52 engaged by the shifting mechanism just referred to, and the bore of said body is square as shown at 55. On each end of the body is formed a ring of clutch teeth 53 capable of engaging similar teeth 54 formed on the adjacent face of the driven sprocket which therefore constitutes the other element of the clutch. As above stated, the longer sleeve 34 holds the sprockets 47 and 48 so spaced that the clutch element 51 may be engaged with either or may stand at a neutral position between them where it is engaged with neither; and the same is true of the other clutch element 56 which stands between the larger driven sprockets 49 and 50. The operating mechanism will of course be such that when one element is being moved the other can not be moved out of its neutral position, and vice versa.

In assembling the parts on the driven shaft, it will be clear that the front end 23 of the latter can be passed completely through the bushing 25 and roller bearing 20, and it is then passed through the short sleeve 24 of the largest gear 50, next through the longer sleeve 34 of the rear clutch element 56, next through the short sleeve within the next smaller gear 49, then through the collar 29, and in the same order through the three sleeves within the forward gears 48 and 47 and the clutch element 51 between them; and finally the rounded front end 23 of this shaft is passed through the forward washer 26 and into the front bearing in the casing as shown. The parts then stand as seen in Fig. 1, and suitable means are employed for preventing their dislocation.

The action of transmission mechanisms of this kind is easily and widely understood. The driving shaft 3 connected by belts with the various driven sprockets causes the latter to rotate at different speeds. When the clutch element 56 is moved forward so that its teeth engage those on the gear 49, the latter is locked to the driven shaft and the power of the engine is transmitted to the driven mechanism at a low rate of speed with great strength; next this clutch element is disengaged from the gear 49 and the other clutch element 51 engaged with the gear 48 to produce mean speed forward; next the same clutch element 51 is disengaged from the gear 48 and moved into engagement with the gear 47 to produce high speed forward; and when occasion arises the clutch element 56 may be moved to the rear to engage its teeth with the large gear 50 which—through the instrumentality of the idler—will produce low speed in a reverse direction.

A striking feature of advantage in the present invention is the fact that all parts can be removed so easily as for cleaning, inspection, and occasional repair.

We do not wish to be limited to the exact position of the shifting mechanism for the clutch element, as the latter may be moved by means of levers on either the right hand or left hand side of the transmission and of the driver. Nor do we wish to be confined to three speed forward and one reverse, as it is quite obvious that a larger or smaller number of driving and driven gears could be employed. And finally the dimensions of parts and the exact details of construction are obviously not necessary to the successful operation of this invention.

What is claimed as new is:

1. In a positive clutch transmission mechanism, the combination with the driving shaft, driving wheels thereon, the casing in which said shaft is journaled, and bearings therein; of an angular driven shaft journaled in said bearings, long and short sleeves having angular bores slidably fitting said shaft and of an aggregate length to stand end to end between said bearings, one end of each sleeve having a head disposed against the opposite end of the next sleeve and the long sleeves being angular on their exterior, clutch elements slidably mounted thereon and having teeth in both extremities, driven wheels journaled on the short sleeves and each having one end provided with a recess receiving a sleeve-head and also shaped to be engaged by a clutch element, and means for shifting the latter.

2. In a positive clutch transmission mechanism, the combination with a driving shaft, a series of gears thereon the casing in which said shaft is journaled, bearings removably mounted in the walls of said casing, and bushings within said bearings; of a square driven shaft made round where it passes through said bushings, a collar mounted movably on said shaft mid-way between said bushings, and at either side of said collar a long and two short sleeves having square bores slidably mounted on said square shaft and enlarged heads at one end seated against the opposite ends of the next sleeves and against said collar, a washer against the outer end of the outermost sleeve adjacent said bearing, a clutch element slidably mounted on the long sleeve and having teeth in its extremities, driven gears rotatably mounted on the short sleeves and having teeth adapted to be engaged by those of said elements, and means for shifting the latter.

In testimony whereof we have hereunto set our hands in presence of two subscribing witnesses.

EDGAR L. GOLD.
WARREN L. BREINIG.

Witnesses:
L. WARREN SNYDER,
HARRY WUNDERLY.